2 Sheets—Sheet 1.

J. HAYNES.
CULTIVATOR, PLOW, AND HARROW.

No. 179,918. Patented July 18, 1876.

WITNESSES:
A. W. Almqvist
John Goethals

INVENTOR:
J. Haynes
BY
ATTORNEYS.

N. PETERS, PHOTO-LITHOGRAPHER, WASHINGTON, D. C.

2 Sheets—Sheet 2.

J. HAYNES.
CULTIVATOR, PLOW, AND HARROW.

No. 179,918. Patented July 18, 1876.

WITNESSES:
A. W. Almquist
John Goethals

INVENTOR:
J. Haynes
BY
ATTORNEYS.

ID="page"

UNITED STATES PATENT OFFICE.

JACOB HAYNES, OF BASNETTSVILLE, WEST VIRGINIA.

IMPROVEMENT IN CULTIVATOR PLOWS AND HARROWS.

Specification forming part of Letters Patent No. 179,918, dated July 18, 1876; application filed May 1, 1876.

*To all whom it may concern:*

Figure 1:
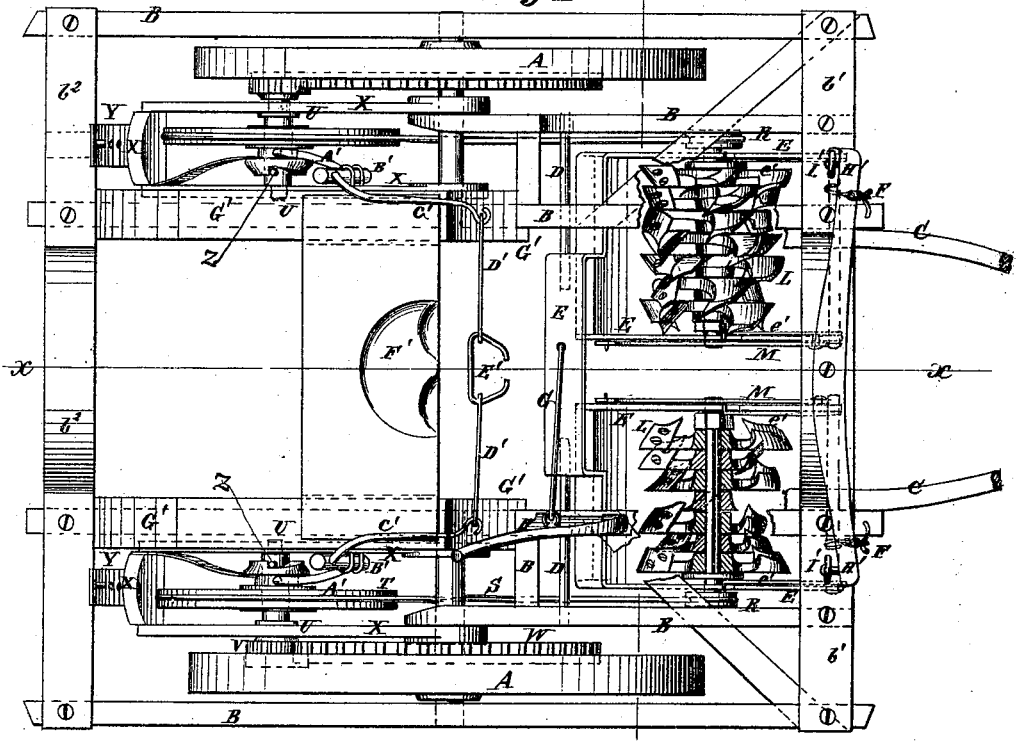
Figure 2:
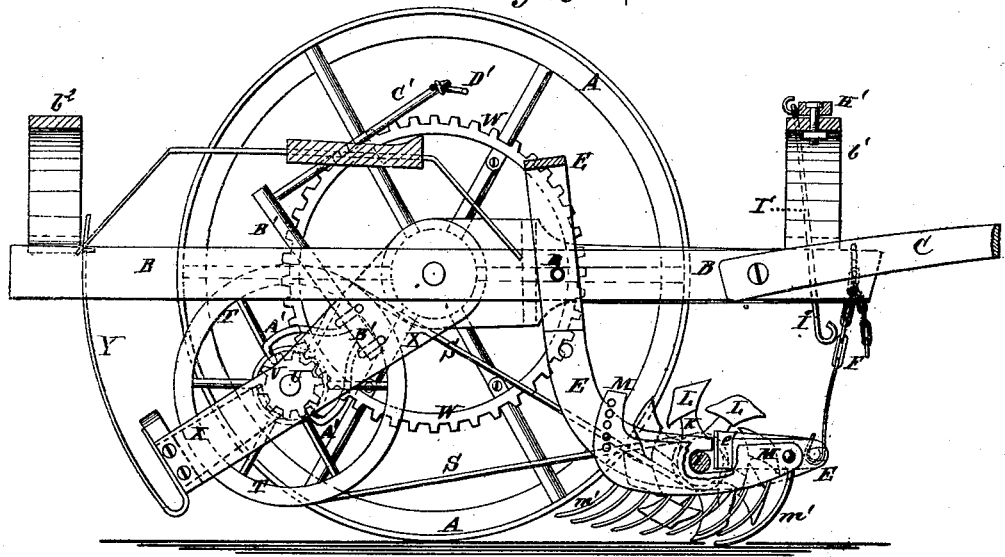
Figure 3:
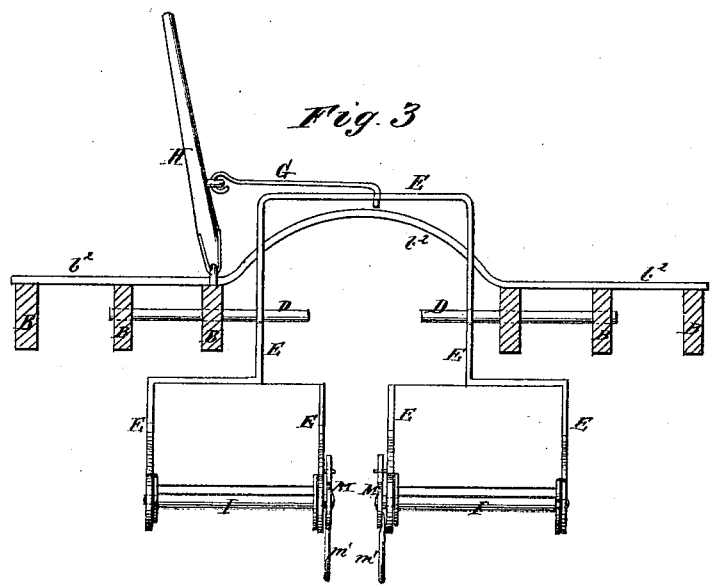
Figure 4:
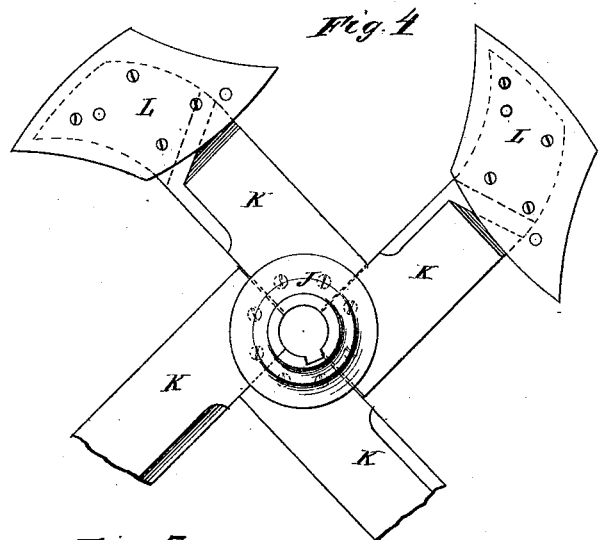
Figure 5:
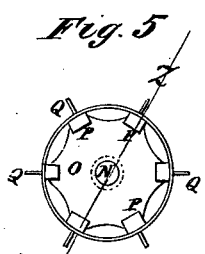
Figure 6:
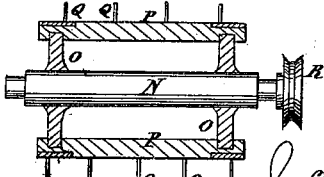

Be it known that I, JACOB HAYNES, of Basnettsville, in the county of Marion and State of West Virginia, have invented a new and useful Improvement in Cultivator Plows and Harrows, of which the following is a specification:

Figure 1, Sheet 1, is a top view of my improved plow. Fig. 2, Sheet 1, is a vertical longitudinal section of the same taken through the line $x\,x$, Fig. 1. Fig. 3, Sheet 2, is a detail cross-section of the frame, taken through the line $y\,y$, Fig. 1, the plows being removed from their shaft. Fig. 4, Sheet 2, is a detail view of one circle of plow-standards detached from the shaft. Fig. 5, Sheet 2, is an end view of one of the harrows. Fig. 6, Sheet 2, is a longitudinal section of the same taken through the line $z\,z$, Fig. 5.

Similar letters of reference indicate corresponding parts.

The object of this invention is to furnish an improved machine for loosening up the soil and cultivating corn and other crops planted in hills and drills, and which shall be simple in construction and easily guided and controlled.

The invention will first be described in connection with drawing, and then pointed out in the claims.

A are the wheels, the journals of which revolve in bearings in the frame B. The frame B is made in two parts, connected at their forward and rear ends by the arched bars $b^1\,b^2$, so that the machine may be drawn over tall plants without injuring them. C is the tongue, which is made V-shaped, and the ends of its arms are bolted to the inner sides of the forward ends of the parts of the frame B. To the frame B, a little in front of the journals of the wheels A, are attached two rods, D, which project inward and pass through holes in the upper parts of the iron frames E, the upper ends of which are connected together. The lower parts of the frames E are bent forward, and their forward ends are supported by chains F, which are hooked upon hooks attached to the forward end of the frame B, so that the frames may be raised and lowered to adjust the plows to work deeper or shallower in the ground, as may be desired. The upper part of the frame E is made narrower than the space between the parts of the frame B, so that the said frame may have a lateral movement to guide it along crooked rows, and to avoid irregular hills. To the top bar of the frame E is attached one end of a rod, G, the other end of which is attached to a lever, H. The lower end of the lever H is pivoted to the frame B, so that by working the lever H the frames E may be moved laterally. In the side bars of the forward parts of the frame E are formed L-shaped notches to receive the journals of the shafts I, which are kept in place in said notches by buttons $e'$. To the shafts I are keyed seven, more or less, hubs J, to each of which are bolted the inner ends of four plow-standards, K, at right angles with each other and in such a way that the end of each forward standard may rest against the forward edge of the following standard, as shown in Fig. 4. Upon the outer ends of the standard K are formed seats for the plow-plates L, which are so formed that they may be reversed when worn, and used with the other point forward. The hubs J are so arranged upon the shafts I as to bring the plow-plates into spiral lines to operate successively upon the ground. The plows upon the shafts I may be arranged to throw the soil toward or from the row of plants, as may be desired. M are plates, the forward ends of which are pivoted to the inner bars of the frame E, and to their lower edges are attached wires $m'$, which project downward and are inclined or curved to the rearward to prevent any clods or lumps from being thrown against the plants by the plows, while allowing fine soil to pass to the plants. The rear ends of the plates M have a number of holes formed through them to receive pins attached to the said frame E, so that the fenders M $m'$ may be adjusted, as required. The shafts U revolve in bearings attached to the iron frames X, the forward ends of which ride upon and are pivoted to the inner journals of the wheels A. To the rear end of the frames X are attached the lower ends of the spring-bars Y, the upper parts of which have numerous holes formed in them to receive pins attached to the rear cross-bar $b^2$ of the frame B, so that the frames X may be raised and lowered to regulate the tension of the band S, as may be required. Upon the inner ends of the hubs of the band-pulleys T are formed clutch-teeth to catch upon a clutch-pin, Z, attached to the shafts U. The inner ends of the hubs of the pulleys T have ring-grooves formed in them to receive the hook-bars or fork A' of the levers B', which are pivoted to the frames X, and to the upper ends of which are rigidly attached arms c'. To the forward ends of the arms c' are attached the outer ends of two rods, D', the inner ends of which are connected by a ring or link, E', so that both of the levers may be operated at the same time, to throw the plows out of and into gear with the drive-wheels A. F' is the driver's seat, which rests upon bars G', attached to the frame B. To the center of the forward cross-bar $b^1$ is pivoted the double-tree H', to the ends of which are attached the upper ends of the rods I'. The rods I' pass down through holes in the cross-bar $b^1$, and upon their lower ends are formed hooks to receive the single-trees.

Having thus described my invention, I claim as new and desire to secure by Letters Patent—

1. The combination of the stationary rods D, the chains F, the connecting-rod G, and the lever H, with the main frame B, and with the frame E, that carries the plows I J K L, substantially as herein shown and described.

2. The pivoted frames X, and spring-catch bars Y, in combination with the journals of drive-wheels A, frame E, and rotary plows L, substantially as and for the purpose specified.

JACOB HAYNES.

Witnesses:
   RICHARD WELLS,
   DAVID THOMPSON.